US006224060B1

United States Patent
Parker et al.

(10) Patent No.: US 6,224,060 B1
(45) Date of Patent: May 1, 2001

(54) PUMP GAS SEAL WITH PARTICLE EXCLUSION DEVICE

(75) Inventors: Joseph C. Parker, Otsego; Christopher D. McCowey, Portage, both of MI (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 09/292,867

(22) Filed: Apr. 16, 1999

Related U.S. Application Data

(63) Continuation-in-part of application No. 09/208,297, filed on Dec. 9, 1998.

(51) Int. Cl.[7] ............................................. F16J 15/40
(52) U.S. Cl. ........................ 277/365; 277/361; 277/348; 277/352; 277/358; 277/411
(58) Field of Search .................................. 277/348, 352, 277/358, 361, 365, 408, 411

(56) References Cited

U.S. PATENT DOCUMENTS

| 2,420,556 | 5/1947 | Mueller . |
| 3,079,605 | 2/1963 | Thomas et al. . |
| 3,333,856 | 8/1967 | Voitik . |
| 3,372,076 | 3/1968 | Wilkinson . |
| 3,475,033 | 10/1969 | Voitik . |
| 3,575,424 | * 4/1971 | Taschenberg ........................ 277/348 |
| 3,805,882 | 4/1974 | Vallance . |
| 3,880,434 | * 4/1975 | Echard et al. ...................... 277/348 |
| 3,988,026 | 10/1976 | Kemp, Jr. . |
| 4,013,297 | * 3/1977 | Smith .................................. 277/352 |
| 4,071,253 | 1/1978 | Heinen et al. . |
| 4,123,069 | 10/1978 | Sato . |
| 4,136,887 | 1/1979 | Wentworth, Jr. . |
| 4,183,541 | 1/1980 | Wentworth, Jr. . |
| 4,365,816 | 12/1982 | Johnson et al. . |
| 4,721,311 | 1/1988 | Kakabaker . |
| 4,749,200 | 6/1988 | Sehnal et al. . |
| 5,149,249 | 9/1992 | Schellong et al. . |
| 5,490,679 | 2/1996 | Borrino et al. . |
| 5,496,047 | 3/1996 | Goldswain et al. . |
| 5,499,902 | * 3/1996 | Rockwood ............................ 277/348 |
| 5,544,897 | 8/1996 | DiPietro et al. . |

FOREIGN PATENT DOCUMENTS 1 586 226    2/1970  (FR) .

OTHER PUBLICATIONS

"A New Shaft Sealing Solution for Small Cryogenic Pumps", C.P. Morrisseey, John Crane EAA, United Kingdom, Feb. 5, 1996 (5 pages).

EG&G Sealol Industrial Division, "Non–Contacting Welded Metal Bellows Seal for Process Equipment" Type 1010 brochure, Dec. 1996 (6 pages).

* cited by examiner

Primary Examiner—Anthony Knight
Assistant Examiner—E. Peavey
(74) Attorney, Agent, or Firm—Flynn, Thiel, Boutell & Tanis, P.C.

(57) ABSTRACT

A gas seal construction for use on a pump to create a seal between a relatively rotatable pump shaft and housing. A flow barrier arrangement is disposed in close surrounding relationship to the shaft and cooperates with the surrounding housing axially between the seal and the pump chamber for minimizing ingress of pump liquid into the seal chamber during both static and dynamic conditions. The barrier arrangement includes an annular barrier member nonrotatably secured to the shaft and cooperating with an annular shroud which is secured to the housing. The barrier member and shroud have opposed truncated conical surfaces which define a narrow annular passage therebetween which slopes outwardly away from the seal chamber toward the pumping chamber and, at the large diameter end thereof, communicates with an annular sealing zone or dam which is defined between the relatively rotatable barrier member and housing for further restricting ingress of pumping fluid into the seal chamber.

18 Claims, 5 Drawing Sheets

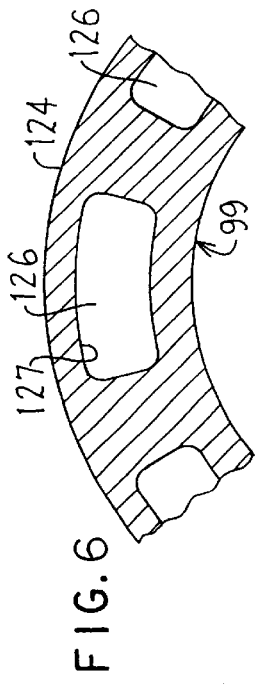
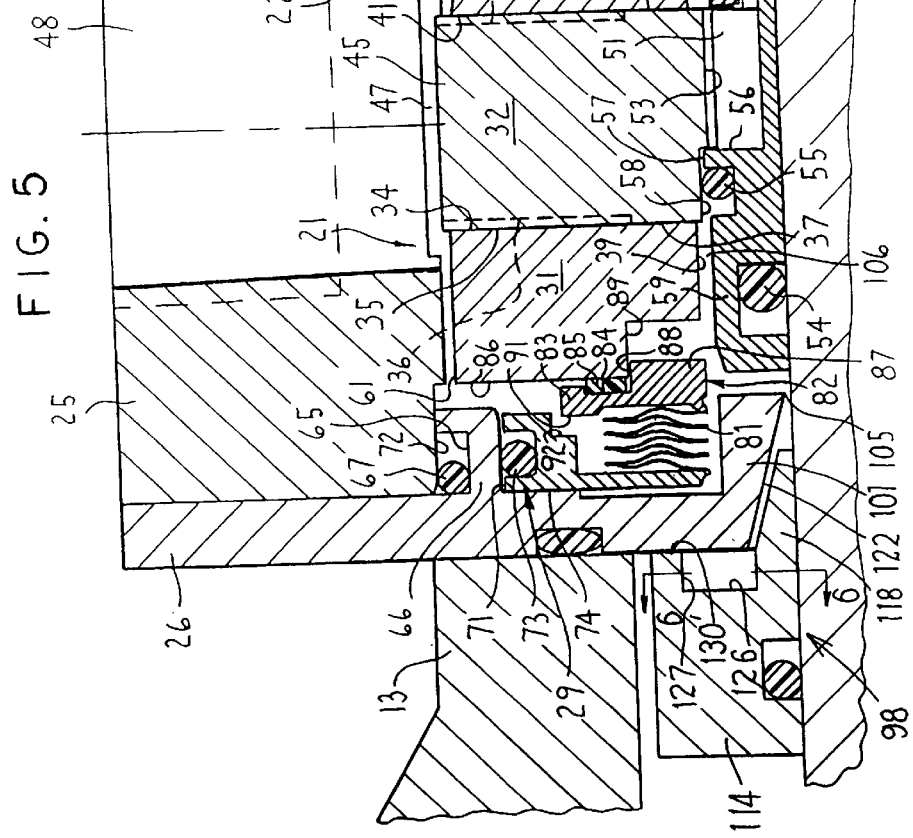
FIG. 6
FIG. 5

US 6,224,060 B1

PUMP GAS SEAL WITH PARTICLE EXCLUSION DEVICE

CROSS REFERENCE TO RELATED APPLICATION

This is a continuation-in-part of copending application Ser. No. 09/208,297 filed Dec. 9, 1998 and entitled "GAS SEAL FOR PUMPS".

FIELD OF THE INVENTION

This invention relates to a face-type gas seal which is particularly desirable for use on pumps and, more particularly, to a gas seal which cooperates between a relatively rotatable pump shaft and pump housing and which incorporates an annular barrier arrangement disposed in close surrounding relationship to the pump shaft generally between the seal and the pumping chamber for minimizing migration of solids in the pumping liquid into the region of the seal faces.

BACKGROUND OF THE INVENTION

Gas seals have been adapted for use on pumps particularly to create a sealed relationship between the rotatable pump shaft and the surrounding pump housing. The gas seal, which may be a single or double unit, typically employs a pressurized barrier gas which is supplied adjacent one periphery of the opposed seal faces (normally the outer diameter), and the opposite periphery of the opposed seal faces (typically the inner diameter) is disposed in communication with the pumping (i.e. process) fluid. The barrier gas is typically pressurized relative to the process fluid and, in conjunction with pumping features such as grooves or the like provided on one of the opposed faces, is effective for creating a gas film between the opposed faces to maintain a small separation therebetween, while at the same time preventing the process fluid from migrating outwardly between the opposed seal faces.

In situations where the process fluid is a liquid, and even though the liquid is termed cleaned, it has been observed that the liquid nevertheless contains some quantity of small solid particles therein as contaminates. Further, as the technology associated with gas seals and the life of such seals continues to improve, it has been observed that the small quantity of solids contained in "clean" liquids can create a problem with respect to the gas seal. In particular, it is believed that these solid particles tend to become trapped at a fairly high level of concentration in the liquid which gains entry into the seal unit adjacent a periphery of the opposed seal faces, typically the inner periphery, and these solids tend to cause erosion or wear of one of the seal members adjacent said periphery of the opposed seal faces.

Accordingly, it is an object of this invention to provide an improvement with respect to the overall seal construction which attempts to at least minimize the aforementioned problem.

More specifically, this invention relates to an improved gas seal construction which is particularly desirable for use on a pump to create a seal between the relatively rotatable pump shaft and housing, which includes an annular barrier arrangement disposed in close surrounding relationship to the shaft axially between the seal and the pump chamber, and which is effective for preventing entry of the solid particles in the process liquid past the barrier arrangement into the region adjacent the opposed seal faces.

In the improved construction of the invention, as briefly summarized above, an annular shroud is fixed to the housing in close surrounding relationship to the shaft and has a generally tapered or truncated conical inner cylindrical surface which slopes outwardly from a point adjacent the shaft generally toward the pumping chamber. An annular barrier member is fixed to the shaft and has a truncated conical nose portion which projects into the truncated conical opening of the shroud to define a very narrow clearance therebetween. The nose portion of the annular barrier member is fixed to an annular flange part which projects radially outwardly beyond an axially adjacent and opposed stationary housing plate. The annular flange part and housing plate have opposed annular surfaces maintained substantially in abutting contact to create an annular sealing zone or dam similar to a mechanical seal, which sealing zone assists in isolating the pumping chamber from the seal chamber.

In the construction of the invention, the small diameter end of the shroud, which is disposed adjacent the seal-side, has a diameter which exceeds the shaft diameter by only a small radial clearance so that relative rotation between the shaft and the surrounding shroud, and the rotational effect on the process liquid, causes the solid particles due to their greater weight to be displaced radially outwardly by centrifugal force so as to move into a position adjacent the inner truncated conical wall of the shroud, with the solid particles then flowing axially along this shroud from the small to the large diameter end thereof, thereby permitting return of many of the solid particles to the pumping chamber.

In addition, in the construction of the invention, as summarized above, the annular barrier (or bushing) member is mounted on and rotates with the shaft, and cooperates with the housing of the seal assembly at the inboard end thereof to restrict entrance of solids from the pumping chamber into the seal chamber during both static and dynamic operation of the seal arrangement. The bushing is loaded hydraulically by the liquid in the pumping chamber so that an annular face on the tapered flange part is urged into abutting contact with an opposed face on a stationary retainer plate associated with the seal assembly to create a restricted annular flow zone or dam therebetween for solids and liquids, which restricted flow zone at its radially inner edge communicates with the outer end of the narrow pathway defined between the opposed truncated conical surfaces defined on the shroud and nose portion of the bushing member. This arrangement hence further restricts the ability of solids in the pumping liquid from entering into the seal chamber, particularly during static conditions.

In the invention, as aforesaid, the face of the annular flange part of the bushing member is also preferably provided with pockets or grooves therein so as to minimize the contact area between the bushing member and the retainer plate.

In addition, with this arrangement the barrier gas which passes through the inboard gas seal into the seal chamber, being of higher pressure than the process liquid, tends to migrate through the narrow passage defined between the opposed conical surfaces and tends to collect at the inner boundary of the seal zone defined between the bushing member and the retainer plate, thereby further restricting the inflow of process liquid into the seal chamber.

Other objects and purposes of the invention will be apparent to persons familiar with arrangements of this general type upon reading the following specification and inspecting the accompanying drawings.

BRIEF DESCRIPTION OF THE DRAWINGS

FIG. 5 is a view similar to FIG. 2 but illustrating a variation of the bushing.

FIG. 6 is an enlarged fragmentary sectional view taken along line 6—6 of FIG. 5.

Figure 1:
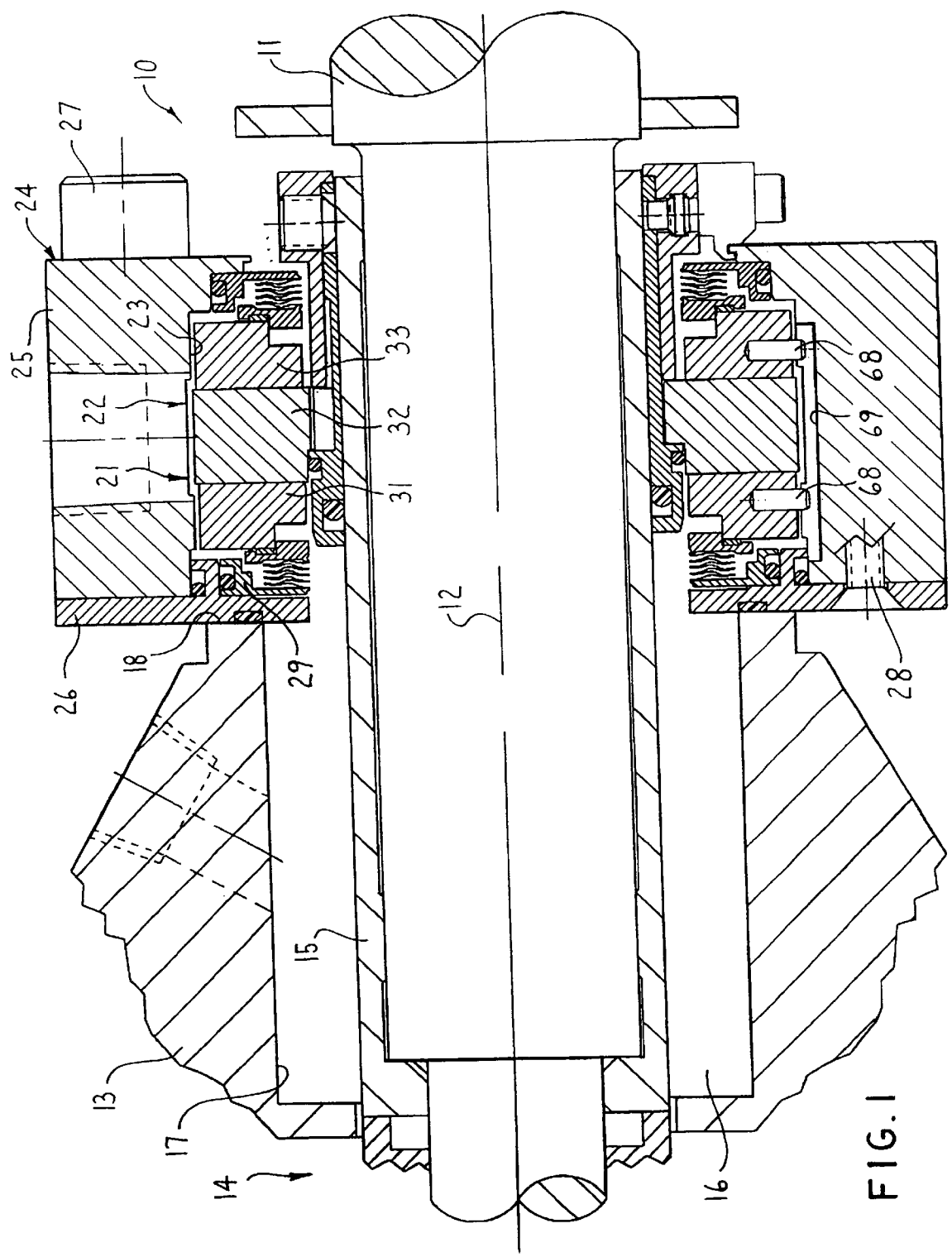
FIG. 1 is a central cross sectional view taken axially through the stuffing box of a pump and showing a double-gas seal cooperating with and surrounding a rotatable pump shaft.

Certain terminology will be used in the following description for convenience in reference only, and will not be limiting. For example, the words "upwardly", "downwardly", "rightwardly" and "leftwardly" will refer to directions in the drawings to which reference is made. The words "inward" and "outward", when used in conjunction with the pump, will refer to directions which are respectively inwardly of the stuffing box toward the pumping chamber or outwardly away therefrom. The words "inwardly" and "outwardly" will also refer to directions toward and away from, respectively, the geometric center of the overall seal assembly and designated parts thereof. Said terminology will include the words specifically mentioned, derivatives thereof, and words of similar import.

DETAILED DESCRIPTION

Figure 2:
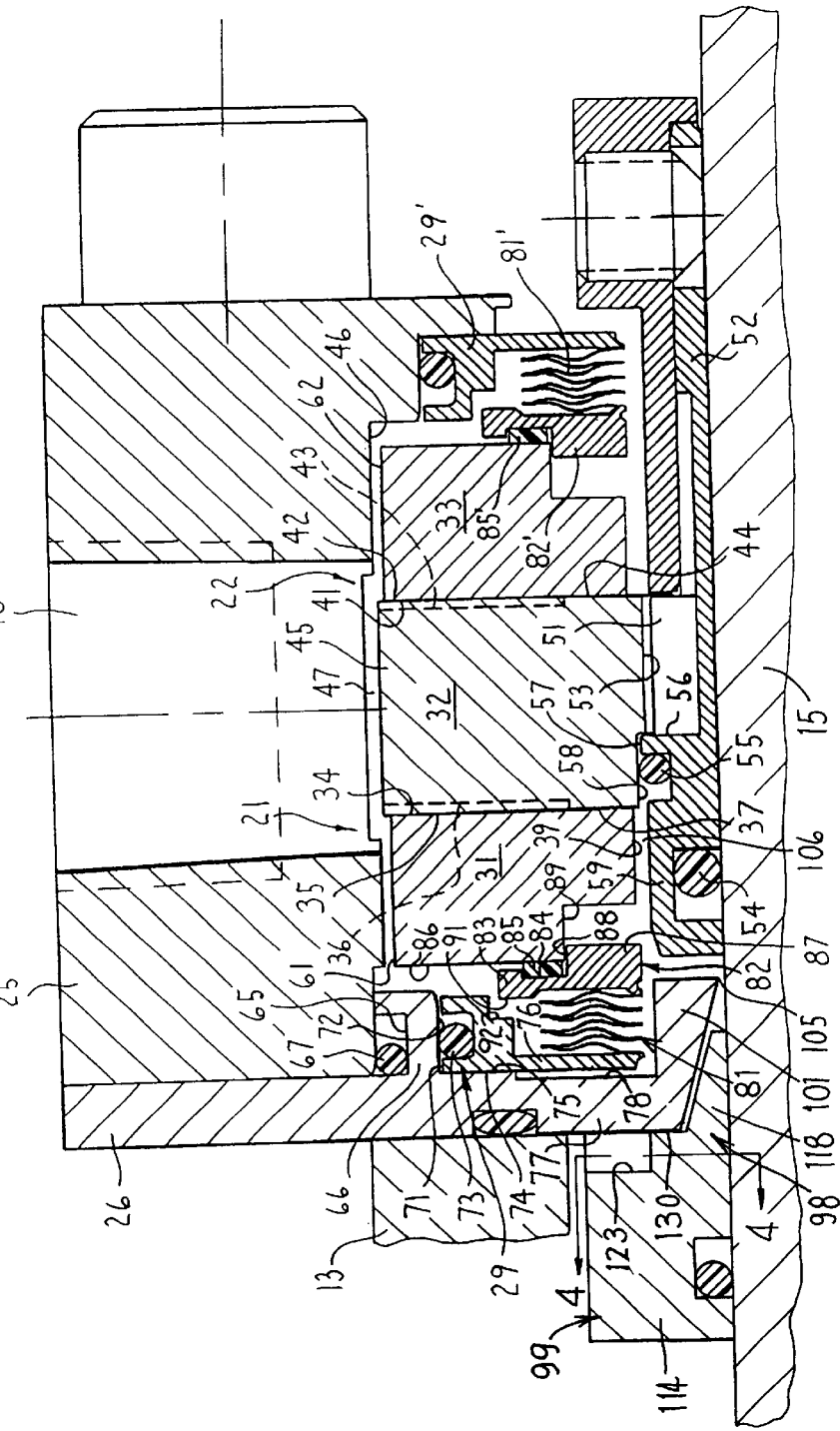
FIG. 2 is an enlarged sectional view showing part of the upper half of the seal arrangement shown in FIG. 1, the seal being shown in its normal operating position and having an annular barrier arrangement associated with the inboard end thereof.

FIGS. 1 and 2 illustrate a double seal arrangement 10 disposed in surrounding relationship to a shaft 11 which rotates about its axis 12, and which is rotatably supported on and projects outwardly from a housing 13 associated with a fluid handling device such as a pump 14. In the illustrated embodiment the shaft 11 includes a surrounding shaft sleeve 15 fixed thereto. The housing 13 has a sleeve portion which defines an annular stuffing box or chamber 16 in surrounding relationship to the shaft 11. This stuffing box 16, in the illustrated embodiment, is for a small seal chamber pump, and the stuffing box is defined within an outer annular wall 17 defined by the pump housing. The seal arrangement 10 is disposed to substantially abut an outer end 18 of the stuffing box housing to permit a sealing closure of the outer end of the stuffing box 16.

The seal arrangement 10 includes axially inboard and outboard seal units 21 and 22, respectively, positioned within an annular chamber 23 defined by a gland structure 14 fixed to the pump housing 13 in surrounding relationship to the shaft 11. Gland structure 24 includes a main gland plate 25 which axially abuts an inner gland or retainer plate 26, the latter being sealing engaged to an end face of the stuffing box housing. Suitable fasteners or screws 27, 28 fixedly join plates 25, 26 together and effect securement thereof to the pump housing.

The inboard seal unit 21 includes a first annular seal ring (i.e. "first stator") 31 which rotatably surrounds the shaft 11 and cooperates with an axially adjacent second seal ring (i.e. "rotor") 32. First seal ring 31 is nonrotatably secured relative to the surrounding gland plate, and second seal ring 32 is rotatable due to its nonrotatable securement relative to the shaft. The outboard seal unit 22 is of similar construction and includes a third seal ring (i.e. "second stator") 33 which is nonrotatably secured relative to the gland structure and is disposed axially outwardly of the second seal ring 32. The third seal ring 33 cooperates with the second seal ring 32 to define the outboard seal unit.

More specifically, the inboard seal unit 21 includes flat and substantially planar ringlike seal faces 34, 35 respectively defined on seal rings 31, 32 and disposed on directly adjacent and axially opposed end faces thereof which extend in substantially perpendicular relation to axis 12. At least one of seal faces 34, 35 is provided with a plurality of shallow grooves 36 formed therein, these grooves being formed in the rotating seal face 35 in the illustrated embodiment. The grooves 36 in the illustrated embodiment project radially inwardly from the outer diameter of the interface between seal faces 34, 35, with the inner ends of the grooves terminating in radially spaced relationship from the radially inner diameter of the seal face interface so as to define an annular nongrooved dam region 37 adjacent the radially inner end of the interface between the opposed seal faces 34, 35. The grooves 36 are disposed in circumferentially spaced relation around the respective seal face, and typically are angled circumferentially as they project radially inwardly, commonly being referred to as spiral or angled grooves.

The outboard seal unit 22 is similarly constructed and includes annular ringlike seal faces 41, 42 which are respectively defined on seal rings 33, 32 and disposed on adjacent and directly opposed axial end surfaces thereof. The faces 41, 42 are formed or configured in a known manner to create a hydrodynamic gas seal therebetween during relative rotation of the seal faces. For example, in the illustrated embodiment, one of the faces 41, 42 (i.e. face 42 in the illustrated embodiment) is provided with shallow grooves 43 which are formed in the seal face in circumferentially spaced relation therearound, with these grooves 43 conventionally angling circumferentially as they project radially inwardly from the outer diameter of the interface between the seal faces 41, 42. The grooves 43 are also separated from the inner diameter of this seal interface by a nongrooved annular dam 44.

The specific configuration of the seal faces 34–35 and 41–42, and of the grooves and dams associated therewith, is conventional and one example of a known seal face configuration for a gas seal is illustrated by U.S. Pat. No. 5 556 111. Other known face patterns, including a wavy face design (i.e., U.S. Pat. No. 4,836,561) can be provided on the faces of the seal rings.

The second seal ring 32 defines thereon an outer annular wall 45 of smaller diameter than and spaced radially inwardly from the stepped inner annular wall 46 of main gland plate 25, thereby defining an annular chamber 47 therebetween to which is supplied a pressured barrier fluid, normally pressurized inert gas such as nitrogen. The main gland plate 25 has a supply port 48 communicating with the barrier chamber 47 and connecting to a conventional exterior system (not shown) for supplying pressurized gas to the barrier chamber.

As illustrated by FIG. 2, the barrier chamber 47 extends axially over and in surrounding relation to seal rings 31 and 33, and communicates with the radially outer ends of the seal interfaces defined between opposed seal faces 34–35 and 41–42. The barrier gas supplied to barrier chamber 47 thus continuously communicates with the outer ends of grooves 36, 43 to create a gas seal between the opposed seal faces in a conventional manner.

To nonrotatably secure the seal ring or rotor 32 with respect to shaft 15, the seal ring 32 has an axially extending slot 53 formed in the inner diameter thereof, and this slot accommodates a key 51 secured to an elongate shaft sleeve 52, the latter surrounding and being nonrotatably secured to shaft 15, as by a set screw. An elastomeric O-ring 54 creates a sealed relationship between shaft sleeve 52 and shaft 15.

The rotor 32, intermediate the axial ends thereof, and adjacent the inner axial side (the left side in FIG. 2), has a radially inner stepped configuration defined by an annular wall or shoulder 57 which projects radially outwardly from the inner diameter and which joins to an axially extending inner annular wall 58, the latter projecting axially for intersection with end face 35. The recess or step defined by walls 57 and 58 accommodates a radially raised annular hub 59 as defined on shaft sleeve 52. This hub 59 has an inner annular end face 56 which axially opposes and abuts the shoulder 57 to securely axially position the rotor 32 to prevent axial outward movement thereof. This hub 59 also has an annular surrounding groove which opens radially outwardly and contains therein an elastomeric seal ring (i.e. an Oring) 55 for maintaining a sealing engagement with the inner wall 58 of the rotor.

In a preferred embodiment, the diameter of the inner rotor wall 58 substantially corresponds to the diameter of the adjacent inner annular wall 39 of stator 31, particularly the inner diameter of the seal face 34 formed thereon. This prevents imposition of undesired unbalanced axial forces on the rotor 32 by the process fluid.

The stators 31 and 33 respectively have outer annular walls 61 and 62 which are preferably spaced from the stepped inner annular wall 46 of the main gland plate 25.

The inner retainer plate 26 includes an annular flange 66 which projects axially and concentrically into the interior chamber of main gland plate 25. Flange 66 has a surrounding annular groove 65 containing an elastomeric seal ring (i.e., an O-ring) 67 which is maintained in sealing engagement with the inner wall 46 of gland plate 25.

Each of stators 31 and 33 is nonrotatably secured but axially movable relative to the surrounding gland plate 25. For this purpose each stator 31, 33 has a key or pin 68 (FIG. 1) fixed thereto and, in the illustrated embodiment, projecting radially outwardly into an axially elongate slot 69 defined in the inner wall of the gland plate 25 to permit the stators to move axially relative to the gland plate.

Gland structure 24 also mounts thereon a backing member formed as an axially slidable annular pressure piston or pusher 29. In the illustrated embodiment, this pusher 29 is H-shaped in axial cross section, and includes a radially outer annular wall 71 which is concentrically and axially slidably supported on a radially inner annular wall 72 defined on the annular flange 66. The annular wall 71 has an annular groove for captivating an elastomeric seal ring (i.e. an O-ring) 73 in sliding sealing engagement with the annular wall 72. The pusher 29 also has a radially inwardly extending rear wall 74 disposed in opposed relation to a front wall 75 on the retainer plate 26. Under normal seal conditions, rear wall 74 abuts front wall 75 as shown in FIG. 2.

Pusher 29 also has an inner annular plate portion 76 which projects radially inwardly from annular part 71. The rear face of plate part 76 is coplanar with the rear wall 74. The annular plate part 76 projects radially inwardly to an inner diameter which is similar in magnitude to the inner diameter of stator 31. The retainer plate 26 also has an inner annular portion 77 which projects radially inwardly substantially coextensively with and, in the illustrated embodiment, somewhat beyond the inner diameter of plate part 76. The inner annular portion 77 of retainer plate 26 has a forwardly facing recessed wall 78 which is spaced rearwardly at least a small distance from rear wall 74, even when the latter abuts front wall 75 as shown in FIG. 2, to provide a clearance space between the opposed surfaces 74 and 78 for access by the pressurized process liquid.

The inboard seal unit 21 also includes an annular bellows 81 which is disposed in surrounding relationship to the shaft and which cooperates between the inner stator 31 and the gland structure, specifically the pusher 29, to define a seal therebetween which creates an isolation between the process liquid and the barrier gas, and which also resiliently urges the first stator 31 axially outwardly (rightwardly in FIG. 2) toward the rotor 32. The bellows 81 has one axial end thereof engaged with a rear end of a seal support member 82. The other axial end of the bellows 81 is engaged against a front end of the pusher 29.

The seal support member 82 is a ring-shaped member having a radially outer portion 83 which, in the axially outwardly directed upper face thereof, is formed with an axially inwardly opening annular groove 84. This groove confines an annular seal ring or gasket 85 of a deformable sealing material, such as Kalrez. The seal ring 85 projects axially beyond the upper front face of support ring portion 83 and provides an outer face adapted to be compressed into sealing engagement with a rear face 86 of stator 31. The annular contact region between gasket 85 and the rear face of stator 31 is disposed approximately centrally between the radially inner and outer diameters of the stator and is positioned relative to the opposed seal faces 34 and 35 so as to provide a desired balance of pressures imposed on the rotor by the barrier and process fluids.

The seal support member 82 also has a radially inner annular portion 87 which defines an outer annular surface 88 which substantially defines the radially inner boundary of groove 84 and which projects axially outwardly a substantial distance beyond the gasket 85. This annular portion 87 projects axially into an annular step formed in the rear inner corner of stator 31, which step is defined by an inner annular wall 89 on the stator, the latter being in axial slidable engagement with annular surface 88 on support member 82. The support member 82 thus effectively supports and centers stator 31 while enabling it to be urged axially toward rotor 32.

The radially outer portion 83 of support member 82 also has a rearwardly-facing annular face 91 thereon, the latter being in a radial plane. This face 91 is normally spaced a predetermined distance from an axially opposed annular face 92 which also extends radially and is defined on the front face of pusher 29. Face 92 is adapted to move into abutting engagement with opposed face 91 in the event of a loss of barrier fluid pressure.

The inner annular region adjacent the bellows 81 is typically exposed to the process fluid pressure (i.e., the pump liquid pressure), and the outer annular region of the bellows is exposed to the barrier pressure, whereby the balance diameter of the seal (sometimes referred to as the mean effective diameter) with respect to the imposition of barrier and process fluid pressures on the stator 31 is thus defined approximately radially midway between the radially outer and inner diameters of the bellows, which balance diameter for the bellows can be accurately defined and maintained.

In addition, bellows 81 and support ring 82 are positioned such that the sealing or contact point with the stator 31, which point occurs at the gasket 85, is positioned so as to be disposed at or radially inwardly of the centroid of stator 31 to maintain proper convergence of the seal faces 34–35 toward the seal dam 37 therebetween. Further, the inner diameter of gasket 85 is preferably located at or radially outwardly of the mean effective diameter (MED or approximately mid-span) of the bellows 81 for proper sealing.

The outboard seal unit 22 is, in the illustrated and preferred embodiment, constructed substantially identically to the inboard seal unit 21. The outboard seal unit 22 includes a bellows unit 81' which cooperates between the main gland plate 25 and the outboard stator 33

When the seal is in the normal operating condition of FIG. 2 wherein pusher 29 abuts against retainer plate 26, the support ring 82 and pusher 29 have opposed and axially aligned end faces 91 and 92 which are axially spaced by a small distance. This axial spacing between end faces 91 and 92 represents the minimal axial spacing between support ring 82 and pusher 29 when in this normal seal condition, and this axial spacing is also significantly less than the axial extent of the bellows 81 which extends between opposed parts 76, 87. The spacing between faces 91, 92 is also less than the spacing between pusher 29 and the rear face of stator 31. Accordingly, in the event of a loss of barrier fluid pressure in chamber 47, then the process fluid pressure acting on the rear face of pusher 29 slides the pusher 29 axially outwardly until face 92 contacts face 91. All of the axially directed process fluid force is then transferred from pusher 29 through faces 91–92 to the support ring 82, and thence onto and through the deformable gasket 85 for application to the rear face of stator 31. The process fluid thus acts to increase the sealing engagement which exists at the seal gasket 85 so that the latter is maintained in proper sealed engagement with both the rear face of stator 31 and the front face of support ring 82, thereby preventing outward escape of process fluid past the gasket. Further, this increased force from the process fluid as imposed on the gasket is all applied to the stator at a desired and predetermined central location, and is applied through a soft contact region, namely the contact region created by the gasket 85, thereby avoiding face-to-face contact between opposed hard faces and significantly minimizing undesired distortion of stator 31.

Under normal seal operation, the seal arrangement 10 will be disposed substantially as illustrated in FIG. 2. A barrier fluid such as pressurized inert gas is supplied to the barrier fluid chamber 47 and hence flows past the exteriors of stators 31, 33 so that the barrier fluid surrounds bellows 81, 81' and also accesses the grooves 36, 43 formed in the seal faces defined adjacent opposite ends of the rotor 32. In addition, the process fluid will normally be present in the stuffing box chamber 16 as well as within the interior annular region defined within the inboard seal unit 21, which process fluid is prevented from escaping due to the seal rings 78 and 85, the bellows 81, and the direct contact between the opposed seal faces 34 and 35, particularly contact at the seal dam 37 when the shaft 11 is stationary or is rotating only at low speed. The pressure of the inert gas supplied to the barrier chamber 47 will typically be higher than the pressure of the process fluid, normally in the range of at least 25 to 50 psi higher. As an example, since the process fluid in small bore pumps typically does not exceed 300 psi, the pressure of the barrier gas may be as high as 350 psi so that the barrier gas pressure will always be higher than the process fluid pressure.

When the pump is in operation and the speed reaches higher rotational limits, the barrier gas is pumped by rotation of rotor 32 into the face grooves 36, 43 to create a hydrodynamic pressure which effectively acts between the opposed seal faces and effects a slight separation therebetween, which separation is permitted due to axial movement of the stators 31, 33 against the urging of the respective bellows 81, 81'. The inert gas thus effectively creates a seal between the opposed seal faces, such as 34–35, the latter now typically being maintained out of contact with one another, and the higher pressure of the barrier gas is such that if any leakage of fluid occurs radially across the opposed seal faces 34–35, then such leakage is in the form of inert gas in small quantities leaking radially inwardly into the process fluid, whereby leakage of process fluid to the surrounding environment can be effectively prevented. The operation of the gas seal as created between the opposed seal faces is conventional, and further description thereof is believed unnecessary.

During operation of the pump, the bellows 81 is not subject to rotation since it is engaged axially between the nonrotatable pusher 29 and support ring 82, and hence is subject only to limited axial compression due to axial movement of the stator 31 caused by lift-off thereof from the rotor 32 as explained above. The bellows 81 always exerts an axial biasing force urging the stator 31 toward the rotor 32. The axial biasing force of bellows 81 is, at all times, applied in its entirety to the stator 31 through the deformable seal gasket 85, thereby providing for a "soft" transfer of force to the stator 31, and at the same time controlling the application of this force to a desired location on the stator. This, in conjunction with the sizing and positioning of the bellows and the gasket, permit the pressure balance diameter between the barrier and process fluids to be originally calculated and accurately maintained in operation, whereby the application of forces to the stator 31 by the barrier and process fluids can be desirably balanced in a manner well known in the seal art so as to maintain only the desired pressures thereon so as to not disrupt the desired cooperation between the opposed seal faces 34 and 35.

If during operation the supply of barrier gas to the chamber 47 is interrupted so that the pressure in the barrier chamber 47 is decreased below process fluid pressure, or if the product fluid pressure improperly exceeds the barrier fluid pressure, then the process fluid pressure acting against the rear faces of the pusher 29 will slidably move the pusher axially outwardly so that the face 92 on the pusher directly contacts the opposed rear face 91 of support ring 82 to increase the sealing pressure at the gasket 85 to prevent escape of process fluid outwardly past the gasket, and to apply a force urging the stator 31 toward the rotor 32 to also effectively maintain a seal therebetween to prevent escape of process fluid.

The configuration of the face grooves 36 and 43 as provided on the rotor 32 can assume many variations, and in fact can be of different configurations if desired, depending upon the properties of the gas seal desired. Further, the grooves can be provided on the stators, rather than the rotor, if desired since such is also a known practice.

While the drawings depicts a double seal wherein a common rotor is utilized having the seal faces defined on opposite axial sides thereof, it will be appreciated that the single two-sided rotor 32 (FIGS. 1–2) can be replaced by two individual rotors, each having a single seal face thereon for cooperation with its respective stator.

The seal arrangement described above is disclosed in copending U.S. application Ser. No. 08/943 617 filed Oct. 3, 1997, which application is owned by the Assignee hereof, and the disclosure of which is in its entirety incorporated herein by reference.

Figure 3:
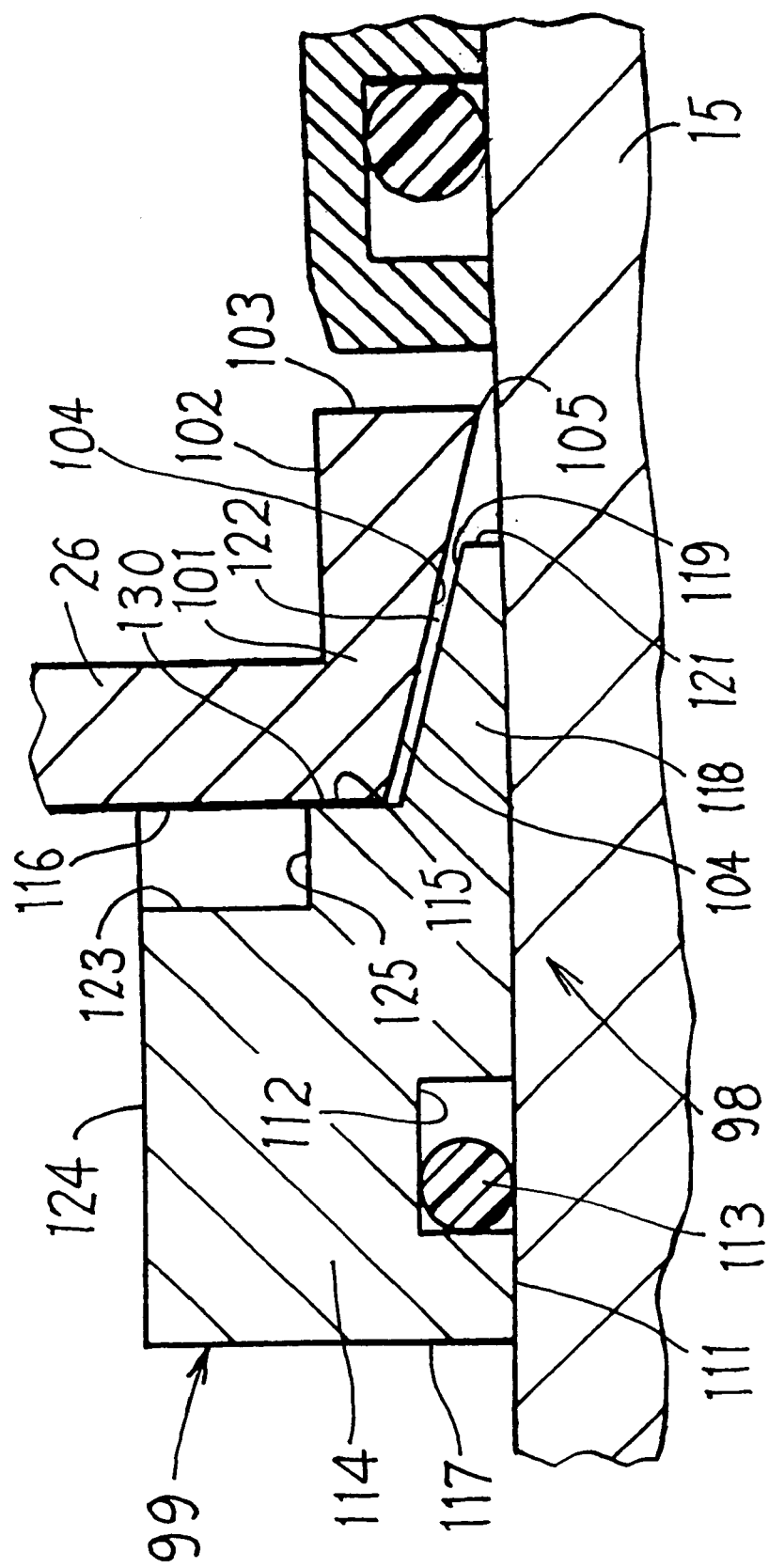
FIG. 3 is an enlarged fragmentary view which illustrates only that part of the seal disposed in close association with the annular barrier arrangement.

Referring to FIGS. 2 and 3, the seal arrangement is provided with an annular barrier arrangement 98 which is disposed in surrounding relationship to the shaft at the axial upstream end (i.e., inboard end) of the seal arrangement to prevent or at least significantly minimize entry of solids from the pumping chamber into the seal chamber. This barrier arrangement 98 includes an annular barrier member or bushing 99 which is rotatably mounted on and surrounds the shaft 15 and cooperates with the stationary retainer plate 26 provided at the inboard end of the seal arrangement. The retainer plate 26 is provided with an annular shroud 101 fixed thereon in surrounding relationship to the shaft 15, which shroud 101 cooperates with the bushing member 99 to restrict inflow of process fluid into the seal chamber.

The shroud 101 is fixed to, here formed integrally with, the radially inner edge of the retainer plate 26 and is defined generally as an axially elongate annular member which concentrically surrounds the rotational shaft 15. The shroud 101 is effectively cantilevered axially away from the retainer plate 26 so as to project within the bellows 81, and is defined by a generally cylindrical outer surface 102 which is of a diameter selected to provide clearance with respect to and hence not contact the bellows 81. The shroud 101 is cantilevered axially so as to terminate at a free end 103 which is disposed so that the shroud projects axially under substantially the entire length of the bellows.

The annular shroud 101, on the inside thereof, is defined by a generally cylindrical inner annular surface 104 which in the illustrated and preferred embodiment is of a truncated conical configuration and is of progressively increasing diameter as it projects axially from the free end 103 to the opposite end which, in the illustrated embodiment, is defined at the outer face of the retainer plate 26 which faces the pumping chamber. The inner conical surface 104 is tapered or sloped so as to diverge outwardly away from the axis of the shaft 15 as the surface 104 projects axially toward the pumping chamber, and this slope is preferably in the range of from about 10° to about 20° relative to the shaft axis, with the preferred angle of slope being about 15°.

In addition, the size of the inner cylindrical surface 104 of the shroud is selected so that only a small annular clearance 105 is defined between the outer surface of the shaft and the minimal diameter of the shroud, which minimal diameter is defined at the apex or free end 103 thereof. This annular clearance 105 is preferably made as small as possible without creating interference with or permitting contact between the shroud and the shaft. The annular clearance 105 preferably is defined by a radial clearance in the range of between about 0.020 inch and about 0.050 inch, with the radial clearance preferably being in the neighborhood of about 0.025 inch.

Considering now the barrier or bushing member 99, the latter comprises an annulus having an inner annular surface 111 which closely conforms to and substantially slidably seats on the shaft 15. The bushing member 99 is disposed within the stuffing box adjacent the inboard end of the seal arrangement and contains therein an inner annular groove 112 in which is contained an elastomeric seal or O-ring 113 which creates a sealed relationship between the bushing and the shaft, and which in addition effectively couples the bushing to the shaft for rotation therewith.

The bushing 99 includes a main annular body part 114 which is of sufficient radial extent as to project radially outwardly so as to substantially radially overlap the retainer plate 26 whereby the body part 114 has an annular axial end face 115 thereon which is disposed generally in a plane which extends perpendicularly with respect to the shaft axis, and is disposed in directly opposed and normally abutting engagement with the axially inwardly projecting end face 116 defined on the retainer plate 26. The other end of the main body part 114 defines thereon an end face 117 which is exposed to the process liquid, which liquid acting against the face 117 imposes on the bushing member 99 an unbalanced force which normally axially urges the bushing face 115 into contact with the retainer plate face 116.

The bushing member 99 also includes an annular nose part 118 which projects coaxially outwardly beyond the end face 115, and is of a generally truncated exterior conical configuration so as to generally closely conform to and nest within the tapered opening defined by the shroud 101. This nose part 118 has a surrounding exterior surface 119 which is of a truncated conical configuration and which projects axially away from a junction with the end face 115, with the surface 119 converging as it projects toward its small diameter end as defined by the free end 121 of the nose part. The truncated conical surface 119 has the same slope as the interior truncated conical surface 104 of the shroud 101 so as to extend generally in parallel relationship therewith. The opposed truncated conical surfaces 104 and 119 are normally disposed closely adjacent but slightly radially spaced from one another to define an extremely narrow annular but elongate passage 122 between the shroud and the bushing member. The radial width of the passage 122 (i.e. the radial clearance between the shroud and the bushing nose part) will typically be in the range of about 0.020 inch to about 0.050 inch, preferably being about 0.030 inch.

The bushing member 111 is also preferably provided with a plurality of circumferentially spaced pockets or grooves formed in the bushing face 115. In the arrangement illustrated by FIGS. 2–4, the main body part 114 has a plurality of pockets or grooves 123 formed therein, which grooves open axially outwardly through the bushing face 115, and also open radially inwardly from the outer peripheral surface 124. The grooves terminate at radially inner bottom or base walls 125, the latter preferably being spaced radially outwardly a sufficient distance from the large diameter end of the tapered nose part 118 so as to engage the retainer face 116 at a location spaced radially outwardly sufficiently to define an annular contact zone 130 of significant radial width between the faces 115 and 116, which contact zone 130 extends radially from the outer diameter of the large diameter end of the passage 122 to the inner walls 125 of the grooves 123. This contact zone 130 thus effectively functions like a dam so as to restrict flow of fluid therepast. The grooves 123 are effective for collecting particles therein, and for permitting the particles to be thrown radially outwardly back into the pumping chamber due to the rotatable centrifugal effect of the bushing member. With the arrangement of FIGS. 3–4, and specifically the provision of the radially outwardly opening grooves 123, the bushing has a configuration resembling a vane impeller, and the effective dam or seal zone 130 between the opposed faces 115–116 is at a smaller diameter, namely between the grooves and the tapered nose part, and therefore lower hydraulic loading can be utilized for maintaining the bushing in contacting engagement with the retainer plate.

Figure 4:
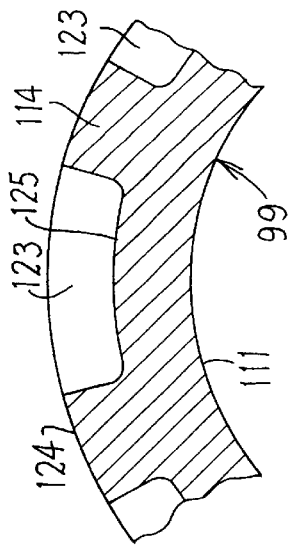
FIG. 4 is an enlarged fragmentary sectional view of the bushing taken generally along line 4—4 of FIG. 2.

As an alternative, the radially outwardly opening grooves 123 of FIGS. 2–4 can be replaced with a plurality of circumferentially spaced pockets or grooves 126 as illustrated in FIGS. 5–6. The pockets 126 extend radially outwardly from the large-diameter end of the tapered nose part 118, and terminate at an outer wall 127 which is spaced radially inwardly from the outer exterior periphery 124 of the bushing member, thereby providing an annular seal contact area (or dams) 130' disposed radially outwardly of the pockets 126. The pockets 126 are axially deep and communicate with the large-diameter end of passage 122, whereby the pockets function to collect solids or contaminants therein to prevent ingress into the seal chamber.

The bushing member is preferably constructed of a chemical-resistant material, typically a non-metallic material such as plastic (i.e. reinforced PTFE) or carbon material. The opposed seal contact faces, namely the retainer face 116 and the bushing face 115, are typically not lapped inasmuch as creation of a tight seal is not absolutely necessary, but rather effect formation of a restricted path which is effective for preventing or restricting flow of fluid and solids therethrough both when the seal is dynamic (i.e., rotating) and static. Further, after the seal has operated for a short period of time, leakage of barrier gas across the inboard seal faces causes the barrier gas to collect at the shaft and then migrate upwardly through the clearance passage 122 so as to collect adjacent the inner diameter of the barrier dam created between the opposed contacting faces 115 and 116. This collection of barrier gas adjacent the inner diameter of the barrier dam thus further assists against the ingress of process fluid and solids into the seal chamber. The rotational effect of the tapered nose part 118, and the centrifugal effect imposed on fluid contained in the passage 122, also tends to force the fluid in passage 122 radially outwardly along the passage 122 toward the seal dam face 115, and this also further restricts the ingress of pumping fluid and solids into the seal chamber.

With the arrangement of this invention wherein the barrier arrangement 98 is provided at the inboard end of the seal to isolate the pumping chamber from the seal chamber, numerous advantages can be achieved, namely: positive sealing between the bushing and the retaining plate; deep grooves or pockets formed in the bushing force the particles to be centrifugally displaced outwardly of the grooves or collected within the deep pockets; the tapered annular space between the rotating nose part and the stationary shroud induces positive flow patterns which are always directed radially outwardly toward the pumping chamber; the barrier gas passing through the inboard seal tends to collect between the retaining plate and the shaft to restrict ingression of the process fluid; the material of the bushing provides for high chemical resistance; and the O-ring drive for the bushing simplifies overall construction and installation. With this desirable arrangement, the migration of contaminants and more specifically solid particles from the pumping fluid into the seal chamber can be greatly minimized not only when the seal is in a dynamic or rotational condition, but also when the seal is stationary inasmuch as the dam or barrier provided between the retainer face 116 and the bushing face 115 and the succeeding elongate narrow passage 122 hence effectively restrict the static ingression of pumping fluid into the seal chamber.

The shroud 101 also acts as an intermediate barrier between the rotating shaft 15 and the interior of the bellows 81, and thus prevents any solids in the process liquid from centrifuging outwardly into the interior of the bellows 81, thereby providing additional protection for the bellows by preventing or at least minimizing the amount of solid particles which can gain access into the bellows and deposit between the bellows plates.

The axial length of the inner surface 104 is preferably in the range of about 10 to 20 times the radial dimension of the annular clearance 105.

Figure 7:
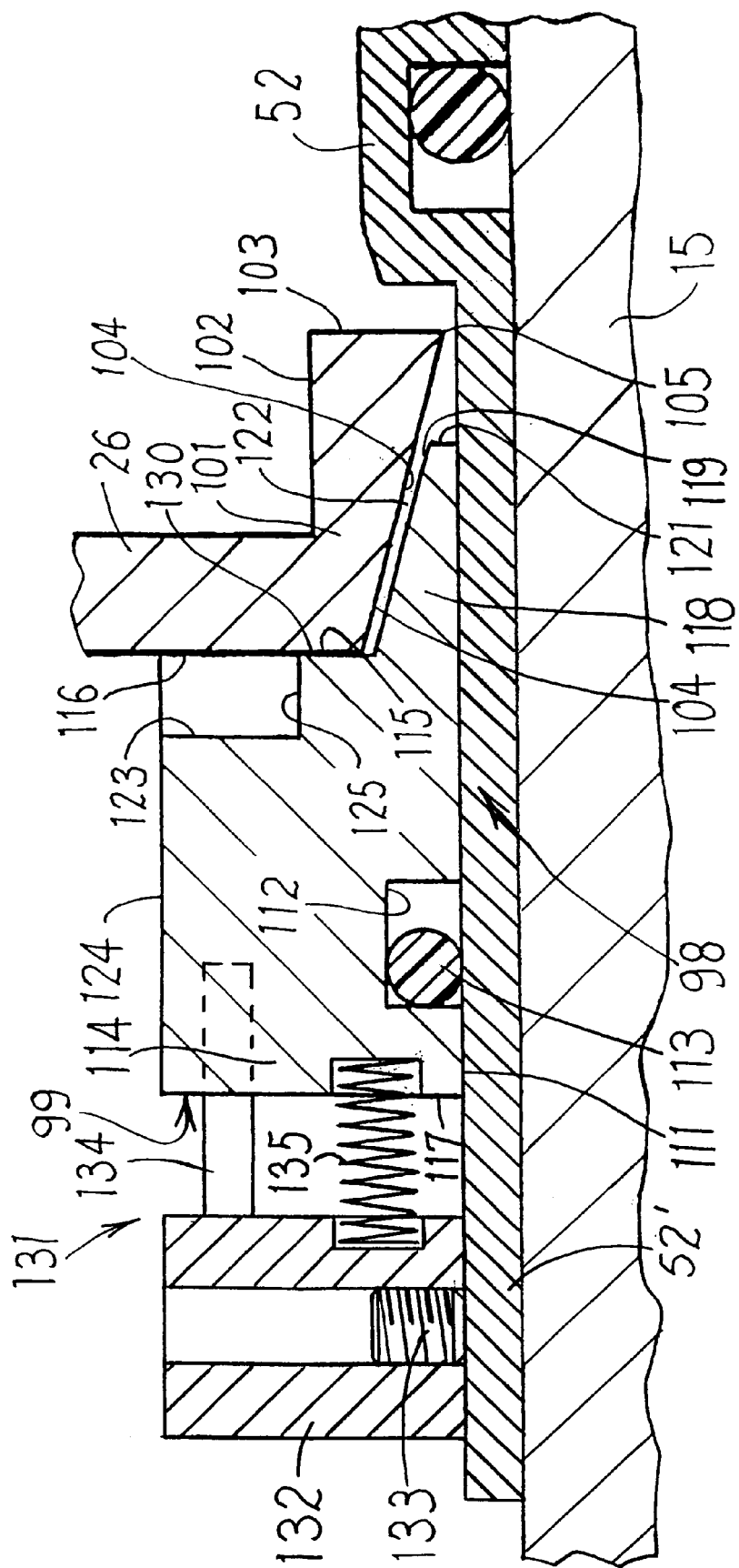
FIG. 7 is a view similar to FIG. 3 but showing additional variations.

As a variation, and as illustrated in FIG. 7, the shaft sleeve 52 is preferably lengthened to include a portion 52' which extends through and mounts the barrier member 99 thereon. This facilities assembly of the entire seal assembly and shaft sleeve 52 as a cartridge which can then be more easily mounted on the shaft 15 at the job site.

In addition, if necessary or desirable, the barrier member 99 can be positively non-rotatably coupled to the sleeve 52 (or shaft 15) by a drive collar arrangement, such as illustrated at 131 in FIG. 7. The arrangement 131 includes a drive collar 132 which is fixed for rotation with sleeve 52 (or shaft 15), as by a set screw or key 133. Collar 132 mounts drive pins 134 which are engaged with barrier member 99 to prevent relative rotation between collar 132 and barrier member 99 while permitting at least limited relative axial movement therebetween. Springs 135 also cooperate between collar 132 and barrier member 99 to axially urge the barrier member into contact with the retainer face 116.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A liquid handling device having a housing structure defining therein a process chamber for handling a process liquid, a rotatable shaft projecting into the process chamber and having a liquid handling element positioned within the process chamber and connected to the shaft for rotation therewith, and a seal arrangement cooperating between the rotatable shaft and the housing structure for preventing leakage of process liquid from the process chamber into the surrounding environment, the seal arrangement including an annular face-seal unit interposed between the shaft and the housing structure, the face-seal unit including an annular rotor nonrotatably coupled to the shaft and disposed axially adjacent an annular stator which is nonrotatably coupled relative to the housing structure, the stator and rotor having axially adjacent and axially-opposed seal faces which cooperate to define inner and outer peripheral annular edge regions, one of said annular edge regions being surrounded by an intermediate chamber which in turn communicates with the process chamber, a pressurized barrier gas being supplied to an annular chamber which surrounds the other annular edge region to create an annular gas seal film between the opposed seal faces, the housing structure including a housing member disposed in surrounding relationship to the shaft adjacent an inboard end of the face-seal unit and defining therethrough an opening which surrounds the shaft and provides communication between said process chamber and said intermediate chamber, the improvement comprising an annular flow barrier arrangement surrounding the shaft and cooperating between the shaft and the housing member in the vicinity of said opening for restricting flow of process fluid from said process chamber into said intermediate chamber, said annular flow barrier arrangement including an annular barrier member nonrotatably and sealingly carried on said shaft in surrounding relationship thereto and inboard of said face-seal unit, said annular barrier member having first and second oppositely oriented annular end faces, said second end face being positioned adjacent and in contacting engagement with a third annular end face defined on said housing member, said first end face being exposed to the process liquid in said process chamber whereby the process liquid acts against said first end face for axially biasing the second end face into engagement with said third end face to define an annular flow-restricting contact dam therebetween, said contact dam being defined between inner and outer peripheral annular edge zones, said outer edge zone being in communication with the process liquid in said process chamber, said annular barrier member including an annular hub part which projects axially into said opening and defines thereon an exterior axially-elongated cylindrical surface which is disposed generally concentrically within an interior axially-elongated cylindrical surface on said housing member and defining said opening, said interior and exterior cylindrical surfaces being disposed in closely adjacent but spaced relation to define an axially elongate annular passage therebetween of small radial clearance, said annular passage at one end communicating with the inner annular edge zone of said contact dam, and said annular passage at the other end communicating with said intermediate chamber.

2. A device according to claim 1, wherein said exterior and interior cylindrical surfaces are each of a truncated conical configuration which slopes outwardly at a small angle relative to the axis of the shaft as the respective cylindrical surface extends from said other end of said passage to said one end thereof.

3. A device according to claim 2, wherein each of the exterior and interior cylindrical surfaces slopes outwardly relative to the shaft at an angle of about 15°.

4. A device according to claim 2, wherein said housing member includes an annular shroud portion which is cantilevered axially toward the face-seal unit in surrounding relationship to the shaft, said annular shroud portion having said inner cylindrical surface defined thereon and extending therethrough for defining said opening.

5. A device according to claim 2, wherein said annular barrier member has a plurality of circumferentially spaced grooves or pockets formed therein and communicating with said contact dam for resisting flow of contaminants into the annular passage.

6. A device according to claim 5, wherein the grooves open radially outwardly from the outer annular edge zone through a surrounding exterior annular surface of the annular barrier member for communication with the process chamber.

7. A device according to claim 5, wherein the pockets communicate between the inner annular edge zone and said one end of said annular passage.

8. A device according to claim 2, wherein the annular barrier member includes an annular portion which surrounds and is sealingly but axially slidably supported on the shaft, said hub part projecting axially from one end of said annular portion and having a substantially truncated conical configuration which projects into said opening, said annular barrier member also including an annular flange portion which projects radially outwardly from the annular portion and is disposed axially adjacent and in radial overlapping relation to said housing member, said hub part being substantially axially cantilevered relative to said radial flange portion, whereby said annular contact dam is defined in exterior surrounding relationship to said hub part adjacent a large diameter end thereof where the hub part joins to the radial flange portion.

9. A device according to claim 2, wherein the annular barrier member is constructed of a chemical-resistant nonmetallic material.

10. A device according to claim 1, wherein said annular barrier member is axially slidably and sealingly supported on said shaft to permit the barrier member to axially slide in response to imposition of forces generated by the process liquid so as to maintain said second end face in engagement with said third end face.

11. A liquid handling device having a housing structure defining therein a process chamber for handling a process liquid, a rotatable shaft projecting into the process chamber and having a liquid handling element positioned within the process chamber and connected to the shaft for rotation therewith, and a seal arrangement cooperating between the rotatable shaft and the housing structure for preventing leakage of process liquid from the process chamber into the surrounding environment, the seal arrangement including an annular face-seal unit interposed between shaft and the housing structure, the face-seal unit including an annular rotor nonrotatably coupled to the shaft and disposed axially adjacent an annular stator which is nonrotatably coupled relative to the housing structure, the stator and rotor having axially adjacent and axially-opposed seal faces which cooperate to define inner and outer peripheral annular edge regions, one of said annular edge regions being surrounded by an intermediate chamber which in turn communicates with the process chamber, a pressurized barrier gas being supplied to an annular chamber which surrounds the other annular edge region to create an annular gas seal film between the opposed seal faces, the housing structure including a housing member disposed in surrounding relationship to the shaft adjacent an inboard end of the face-seal unit and defining therethrough an opening which surrounds the shaft and provides communication between said process chamber and said intermediate chamber, the improvement comprising an annular flow barrier arrangement surrounding the shaft and cooperating between the shaft and the housing member in the vicinity of said opening for restricting flow of process fluid from said process chamber into said intermediate chamber, said annular flow barrier arrangement including an annular barrier member nonrotatably and sealingly carried on said shaft in surrounding relationship thereto and inboard of said face-seal unit, said annular barrier member having an annular hub part which projects axially into said opening and defines thereon an exterior axially-elongated truncated conical surface which is disposed generally concentrically within an interior axially-elongated truncated conical surface on said housing member and defining said opening, said interior and exterior conical surfaces being disposed in closely adjacent but spaced relation to define an axially elongate annular passage therebetween of small radial clearance, said annular passage at one end communicating with the process chamber, said annular passage at the other end communicating with said intermediate chamber, and each of the truncated conical surfaces sloping outwardly at a small angle relative to the axis of the shaft as the respective cylindrical surface extends from said other end of said passage to said one end thereof.

12. A seal arrangement for a fluid handling device having a housing structure defining therein a process chamber for handling a process fluid and a rotatable shaft projecting into the process chamber and having a fluid handling element positioned within the process chamber and connected to the shaft for rotation therewith, the seal arrangement comprising: an annular face-seal unit interposed between the shaft and the housing structure, the face-seal unit including an annular rotor nonrotatably coupled to the shaft and disposed axially adjacent an annular stator which is nonrotatably coupled relative to the housing structure, the stator and rotor having axially adjacent and axially-opposed seal faces which cooperate to define inner and outer peripheral annular edge regions, one of said annular edge regions being surrounded by an intermediate chamber which in turn communicates with the process chamber, a stationary retainer member disposed in surrounding relationship to the shaft and defining therethrough an opening which surrounds the shaft and provides communication between said process chamber and said intermediate chamber, and an annular flow barrier arrangement surrounding the shaft and cooperating between the shaft and the retainer member in the vicinity of said opening for restricting flow of process fluid from said process chamber into said intermediate chamber, said annular flow barrier arrangement including an annular barrier member nonrotatably and sealingly carried on said shaft in surrounding relationship thereto and having a first annular end face positioned adjacent and biased into contacting engagement with a second annular end face defined on said retainer member to define an annular flow-restricting contact dam therebetween which is defined between inner and outer peripheral annular edge zones, one said edge zone being in communication with the process fluid in said process chamber, said annular barrier member including an annular part which is disposed within said opening and defines thereon an exterior axially-elongated cylindrical surface which is positioned generally concentrically within an interior axially-elongated cylindrical surface on said retainer member and defining said opening, said interior and exterior cylindrical surfaces being disposed in closely adjacent but spaced relation to define an axially elongate annular passage therebetween of small radial clearance, said annular passage at one end communicating with the other annular edge zone of said contact dam, and said annular passage at the other end communicating with said intermediate chamber.

13. In a fluid handling device having a housing structure defining a process chamber for handling a process fluid, a rotatable shaft projecting into the process chamber, and a seal arrangement cooperating between the rotatable shaft and the housing structure for preventing leakage of process fluid from the process chamber into the surrounding environment, the seal arrangement including an annular face-seal unit interposed between the shaft and the housing structure, the face-seal unit including an annular rotor non-rotatably coupled to the shaft and disposed axially adjacent an annular stator which is nonrotatable relative to the housing structure, the stator and rotor having opposed and axially adjacent seal faces, the improvement comprising a housing member fixed relative to said housing structure and disposed in surrounding relationship to the shaft at an inboard side of said face-seal unit adjacent said process chamber, said housing member being radially spaced from said shaft so as to define an axially extending and annular passage therebetween, said housing member defining an inner surface which is axially elongated and defines an outer boundary of said annular passage, said inner surface being of a generally tapered configuration and having a minimum diameter portion defined at one end of said housing member adjacent said face-seal unit, and an annular barrier member nonrotatably and sealingly carried on said shaft in surrounding relationship thereto and inboard of said face-seal unit, said annular barrier member being positioned within said annular passage and defining thereon an axially-elongated exterior surface which is of a generally tapered configuration, said inner and exterior surfaces being disposed in closely adjacent but spaced relation to define an axially elongate annular narrow passage therebetween of small radial clearance to minimize migration of debris in the process fluid from the process chamber through said annular narrow passage toward said seal unit.

14. A fluid handling device according to claim 13, wherein an annular dam part is nonrotatably and sealingly carried on said shaft in surrounding relation thereto and has an annular face thereon which is urged into contacting engagement with an opposed annular face on said housing structure to define an annular contact dam located between said process chamber and a large-diameter end of said annular narrow passage for restricting flow of process fluid from said process chamber into said annular narrow chamber.

15. A fluid handling device according to claim 14, wherein said annular dam part is fixedly joined to said annular barrier member.

16. A fluid handling device according to claim 14, wherein the annular dam part has a plurality of circumferentially spaced grooves or pockets formed therein and communicating with said contact dam for resisting flow of contaminants into the annular narrow passage.

17. In a fluid handling device having a housing structure defining a process chamber for handling a process fluid, a rotatable shaft projecting into the process chamber, and a seal arrangement cooperating between the rotatable shaft and the housing structure for preventing leakage of process fluid from the process chamber into the surrounding environment, the seal arrangement including an annular face-seal unit interposed between the shaft and the housing structure, the face-seal unit including an annular rotor non-rotatably coupled to the shaft and disposed axially adjacent an annular stator which is nonrotatable relative to the housing structure, the stator and rotor having opposed and axially adjacent seal faces, the improvement comprising a housing member fixed relative to said housing structure and disposed in surrounding relationship to the shaft at an inboard side of said face-seal unit adjacent said process chamber, said housing member being radially spaced from said shaft so as to define an axially extending and annular passage therebetween, said housing member defining an inner surface which is axially elongated and defines an outer boundary of said annular passage, said inner surface being of a generally tapered configuration and having a minimum diameter portion defined at one end of said housing member adjacent said face-seal unit to minimize migration of debris in the process fluid from the process chamber through said annular passage toward said seal unit, and an annular dam member nonrotatably and sealingly carried on said shaft in surrounding relation thereto and having an annular face thereon which is urged into contacting engagement with an opposed annular face on said housing structure to define an annular contact dam located between said process chamber and a large-diameter end of said annular passage for restricting flow of process fluid from said process chamber into said annular passage.

18. A fluid handling device according to claim 17, wherein the annular dam member has a plurality of circumferentially spaced grooves or pockets formed therein and communicating with said contact dam for resisting flow of contaminants into the annular passage.

* * * * *